June 20, 1967 H. GALLINA 3,327,066

CUEING APPARATUS FOR RECORD TAPE

Filed Jan. 26, 1960

2 Sheets-Sheet 1

INVENTOR.
HAROLD GALLINA

BY Brumbaugh, Free
Graves & Donohue his ATTORNEYS

INVENTOR.
HAROLD GALLINA
BY Brumbaugh, Free Graves & Donohue
his ATTORNEYS

United States Patent Office 3,327,066
Patented June 20, 1967

3,327,066
CUEING APPARATUS FOR RECORD TAPE
Harold Gallina, 40 Park View, Belleville, N.J. 07109
Filed Jan. 26, 1960, Ser. No. 4,664
1 Claim. (Cl. 179—100.2)

This invention relates to methods for producing and/or detecting cue marks on a magnetic recording tape. The invention also relates to apparatus which is useable in conjunction with such methods.

My U.S. Patent No. 2,908,771 (issued Oct. 13, 1959) describes the production of cue marks on a magnetic tape either by painting the base side of the tape with an electro-conductive paint, or by adhering to the base side of the tape small patches of material which are electro-conductive on their outer side. While those modes of cueing a tape were the only ones known to me at the time, and while the cue marks so provided are useful in many applications, I have found that such cue marks are disadvantageous in certain respects. Specifically, such cue marks have a tendency to crack, add thickness to the tape to cause irregular motion (and, in some instances, jamming) of the tape as it passes through a tape handling machine. Further, at the places where such cue marks are applied, the tape is rendered stiff to cause the tape to detour out of its normal path with a resulting jerking or jumping motion.

An object of my invention is to overcome the above-noted disadvantages which characterize cue marks provided by electro-conductive paint or by electro-conductive patches.

Another object of my invention is to provide methods and apparatus for cueing a magnetic tape by marks which are produced in an extremely simple, inexpensive and convenient manner, and which are durable, electrically reliable, and easily removed.

Another object of my invention is to provide methods and apparatus for cueing a magnetic tape by marks which have no noticeable effect either upon the mechanical or the magnetic characteristics of the tape.

Yet another object of my invention is to provide methods and apparatus for detecting such cue marks in a manner whereby such marks are manifested by a strong reliable electric signal, and in a manner whereby such signal is caused to occur simultaneously with the reproduction by a tape handling machine of the portion of the reproduced program which is designated by the cue mark from which the signal is derived.

To set forth briefly how these and other objects are realized, I provide cue marks on a magnetic tape by producing abrasive transference from the tip of a friable stylus to a surface of the tape of a dry, tenaciously adhering streak of a marking material which is softer on the Mohr's scale of hardness than the material underlying the mentioned surface. Such a cue mark may be detected by visual inspection. However, as one aspect of my invention, I provide for the detection of such cue marks by employing marking material of the described sort which is electro-conductive, and by electrically detecting the cue marks formed of such electro-conductive material.

For a better understanding of the invention, reference is made to the following description of exemplary embodiments thereof, and to the accompanying drawings wherein.

Figure 1:
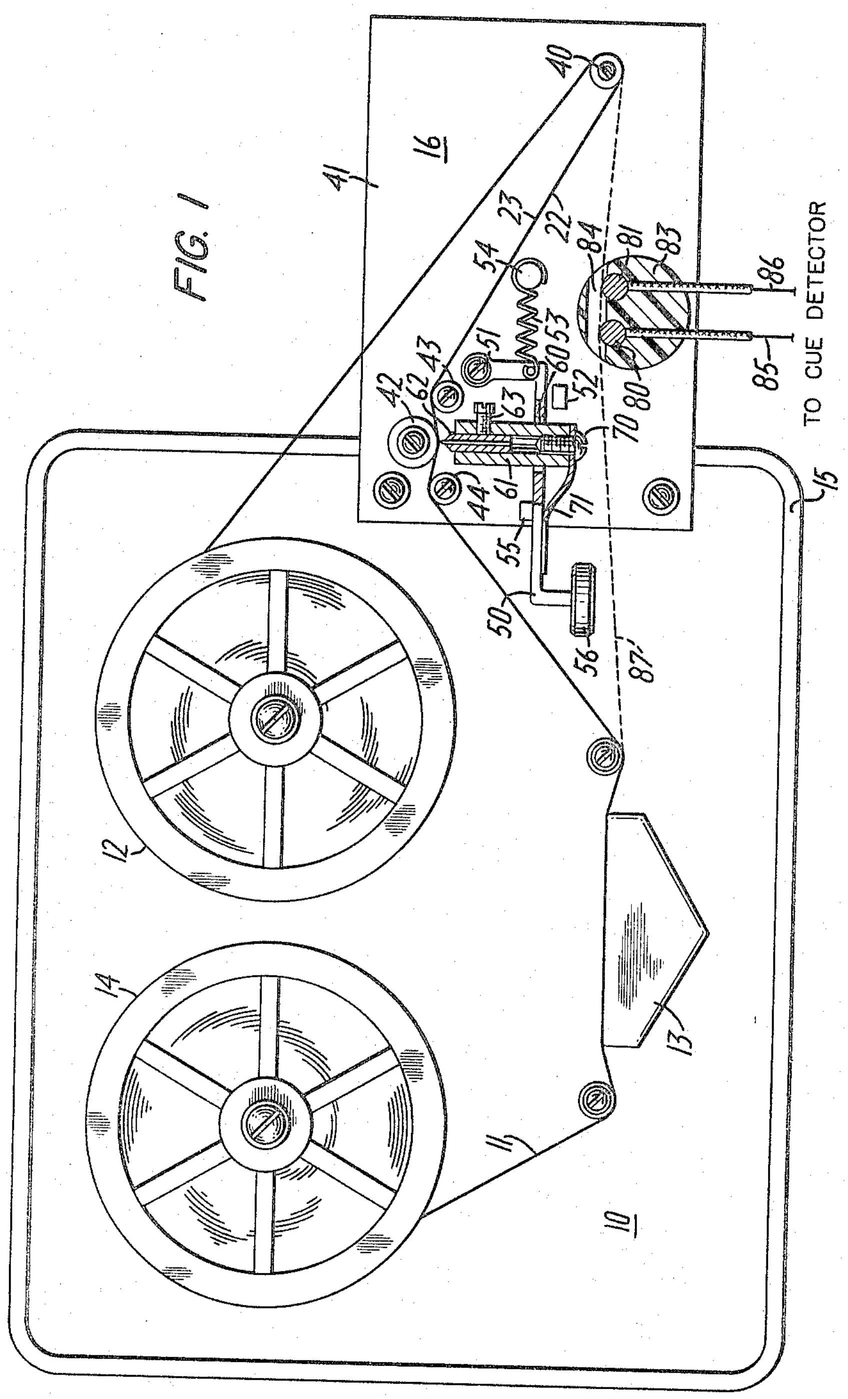
FIG. 1 is a plan view of an embodiment of the invention, some of the parts of this embodiment being shown in cross-section.

Referring now to FIG. 1 (which is partly taken from the mentioned patent), a magnetic recording and reproducing machine 10 operates from a magnetic tape 11 which is supplied from a reel 12 to pass over a signal transfer head 13 and to then be taken up by a reel 14. The machine 10 is characterized by a raised rim 15 to which is affixed the assembly 16 to be later described in detail. When the assembly 16 is so affixed to machine 10, the path of tape 11 from supply reel 12 to head 13 is modified to the extent of routing the tape to pass around or through elements of the assembly 16 in a manner to be described.

Figures 2, 3, 4:
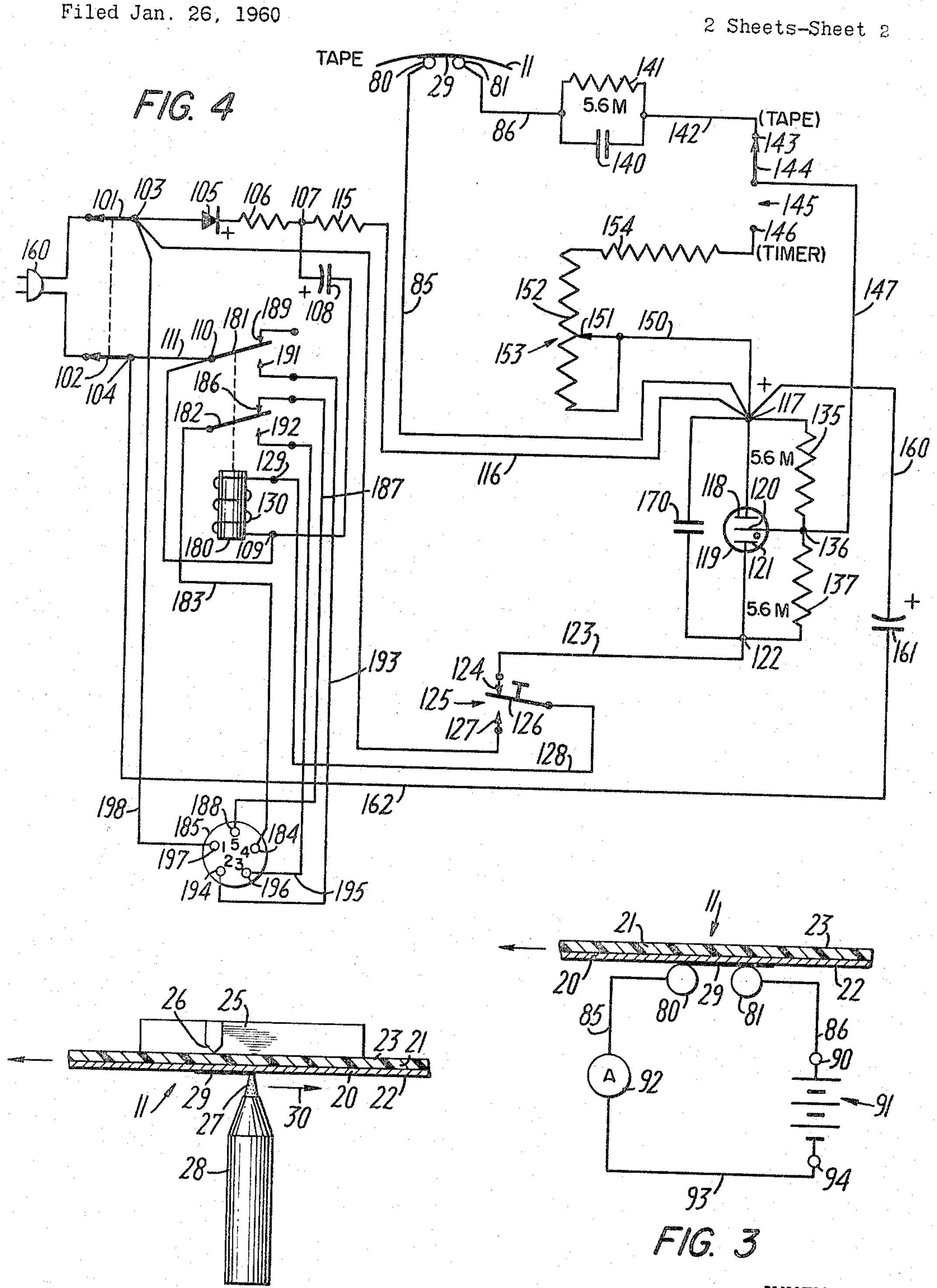
FIG. 2 is a plan view which shows a modification of a detail of FIG. 1, and which illustrates a method alternative to that of FIG. 1 for the practice of the invention.
FIG. 3 is a schematic diagram of a simple circuit which is useable in conjunction with the FIG. 1 embodiment to detect cue marks on a mangetic tape.
FIG. 4 is a schematic diagram of another circuit for detecting such cue marks.

As shown by FIG. 2, the tape 11 consists of a magnetic coating 20 on a base 21, the latter being in the form of an elongated strip of synthetic resinous material, as, say, Mylar or polyethylene. The coating 20 is constituted of a multitude of particles of magnetizable material (e.g. ferrous oxide) and of an admixture with said particles of an amount of filler material. The filler material occupies the interstices between the magnetizable particles to render of semi-glossy smoothness the surface 22 of the magnetizable coating 20. A number of manufacturers treat the coating 20 with a silicone or other lubricant for anti-friction purposes, and this lubricant is likely to render the surface 22 somewhat slick. The surface 23 of base 21 is of glossy smoothness.

In FIG. 2, a section of tape 11 is shown as passing by a block 25 which may be disposed at any convenient location along a guide path for the tape 11, but which is spaced from the head 13 (FIG. 1) by a predetermined distance along the length of the tape 11. The block 25 is disposed on the base side of the tape to act as a backing member for the base surface 23 of the tape. The block 25 further acts as a support for a pointer or sight element 26 which projects upwardly of the top margin (not shown) of the tape to be visible from the coating side thereof.

In FIG. 2, the section of tape 11 is shown as pressed against the backing member 25 by the slightly blunted tip of the scribing stylus 27 of a pencil 28, positioned by hand to bear against the coating surface 22. The stylus 27 is shown as having deposited on surface 22 a streak 29 of the marking material of which the stylus 27 is composed. This streak adheres to surface 22 in a manner which is tenacious in the sense that the material of the streak cannot be dislodged from the surface except by deliberate erasure. As indicated by arrow 30, the streak 29 is produced by originally bringing pencil 28 by hand to a position directly opposite the pointer 26, by advancing the so positioned pencil by hand towards tape 11 to bring stylus 27 into pressure contact with surface 22 (the tape being stationary), and by then moving pencil 28 by hand to the right and in the lengthwise direction of the tape while maintaining stylus 27 in pressure contact with surface 22. The consequent frictional sliding of stylus 27 over surface 22 results in the transference by abrasive action of marking material from the stylus to the surface. To assure that such abrasive transference takes place, the stylus is of a friable character and is composed of material which is softer according to Mohr's scale of hardness than the magnetizable material underlying the surface 22 of the magnetizable coating 20.

The production of streak 29 in the manner described is based on my discovery that a cue mark in the form of such streak can be placed upon the surface of a magnetic tape by a friable stylus composed of suitable material. I have found that, with some difficulty, even an ordinary soft lead pencil, as, say, a No. 1 pencil, can be used to mark the magnetic coating surface of a magnetic tape with such a streak. However, producing a cue mark streak on the magnetic coating surface with an ordinary pencil is a technique which is not particularly satisfactory inasmuch as the contact pressure required is often enough to furrow the tape, the streak which results is a faint one, and such streak has a tendency to smudge badly with use. Therefore, I have found it more satisfactory to employ those types of pencils which are known in the pencil art as "high carbon" pencils.

The stylus of a high carbon pencil is similar to that of an ordinary pencil in that in both the stylus material is a friable material comprising powdered graphite and a binder for the powdered graphite. However, in a high carbon pencil, as contrasted to an ordinary pencil, the graphite employed is of a variety which, in a chemical sense, is of high carbon content (e.g., 98% carbon as opposed to only 2% of impurities), and the binder material is of a character to facilitate abrasive transference of the powdered graphite from the stylus to the surface over which the stylus is frictionally moving. By virtue of those special characteristics, a high carbon stylus is adapted to mark very smooth surfaces providing that (1) the material underlying the surface is harder than the stylus material to thereby have an abrading action on the friable stylus, and (2) the surface is not so smooth as to completely eliminate the minute irregularities which cause the abrading action to take place in the first instance.

By experiment I have found that high carbon pencils can be used to mark even the base surface of a magnetic tape. Because, however, of the glossy smooth character of this base surface, to mark such surface with a high carbon pencil requires an amount of contact pressure which may tend to furrow the tape, and the mark is faint and tends to smudge. In this view, I have found it better to place cues on a tape by marking with a high carbon pencil the surface of the tape which overlies the magnetic coating thereof. I have found that a mark can be so produced by a high carbon pencil on the magnetic surface coating when very moderate pressure is exerted on the pencil in the course of sliding the stylus thereof over the coating surface. The resulting mark or streak is full bodied, easily visible, adheres tenaciously to the substrate surface so as to have little tendency to smudge, and yet can be removed at will by erasing the mark with an ordinary pencil eraser. Inasmuch as such mark has negligible thickness and mechanical strength, the mark has no effect on the mechanical properties of the tape. Furthermore, I have observed that a mark of such sort has no noticeable effect upon the magnetic properties of the tape, i.e., has no noticeable effect upon the suitability of the tape to record or reproduce a program.

Among the high carbon pencils which I have tried and found to give good results are the Koh-Inoor No. 1555, the Dixon No. 2100, and the Dixon No. 2225, the latter being the most satisfactory. In cueing a tape, I have found it desirable to mark the tape with marks which are from 1 to 1½ inches in length and which are of a width of $\frac{1}{64}$ inch or greater.

The ability to mark a tape as described permits the following method for cueing a tape to be practiced in conjunction with a machine of FIG. 1 in the instance where a program (as, say, a sound program) has been prerecorded on the tape. The tape is threaded in a guide path which causes the tape to pass by the backing block 25 in the manner shown by FIG. 2. Thereafter, the tape is run through the FIG. 1 machine and past the signal head 13 which at that time is connected to reproduce the program through a speaker or the like. The reproduction of the program is continued until the program reaches a point at which a cue is desired. Thereupon, the tape is stopped and a cue mark is made in the manner illustrated by FIG. 2 upon the portion of the magnetic coating surface of the tape which is opposite block 25.

Subsequently, the tape is re-run past block 25 and through the machine of FIG. 1 to again reproduce the program. As the tape so moves through the machine, the area of the tape in the vicinity of pointer 26, (FIG. 2) is continuously observed. Eventually the tape motion brings the left-hand end of cue mark 29 into registration with pointer 26. The occurrence of such registration is an indication that, in the second reproduction of the program, the cue point of the program has been reached. This is so for the reason that the pointer 26 is at the same predetermined distance along the length of the tape from the head 13 during the second reproduction of the program as during the first reproduction thereof. Therefore, when the registration of the cue mark and the pointer occurs, the portion of tape opposite head 13 during the second reproduction will be the same as the portion of tape opposite that head when the program was first reproduced.

The method just described can be used for identifying specific portions of a prerecorded program. It can also be used for editing a tape by magnetic erasure, the erasure being started when the cue mark 29 registers with pointer 26. Furthermore, the method can be used for editing by splicing and the like, the splicing being carried out by removing the tape from the FIG. 1 machine, measuring off along the tape from cue mark 29 the distance along the tape by which pointer 26 is separated in the machine from head 13 (the measurements being taken in the direction which, when the tape is in the machine, leads along the tape from pointer 26 to head 13), and cutting the tape at the point thereof which is reached by such measurement. Inasmuch, however, as the method as so far described requires stopping of the tape in order to place a cue thereon, the previously described method does not permit cueing of a tape during the recording of a program.

I have found that the tape can be cued during a program recording by a method which will be explained in connection with the showing of FIG. 1. Referring to this figure, as a preliminary to program recording, the tape 11 is led from supply reel 12 to assembly 16 and, within this assembly, around a post (or roll) 40 upstanding from a plate 41 affixed to the rim 15 of the recording and reproducing machine 10. From post 40 the tape 11 is threaded through a guide path section formed by a center idler roll 42 which contacts the base or back surface 23 of the tape, and by a pair of side idler rolls 43, 44, which are disposed to either side of the center roll 42, each of the side rolls 43, 44 contacting the front or magnetic coating surface 22 of the tape. The side rolls 43, 44 are suitably disposed (1) to bow the tape slightly over the cylindrical surface of center roll 42, and (2) to permit access to the bowed portion of the tape from that side of the tape presented by magnetizable coating surface 22.

Disposed opposite center roll 42 on the side of the tape away from that roll is a bell-crank lever 50 which is rotatable about a pivot 51 such that the central portion of the lever is movable toward and away from the portion of tape bowed over roll 42. The lever is normally maintained in rearward position against a rear stop 52 by a tension spring 53 of which one end is connected to the lever, and of which the other end engages a pin 54 mounted on plate 41. The lever 50 may, however, be advanced forwardly (against the urging of the spring 53) to bear against a forward stop 55 by exerting pressure by hand on a key 56 disposed at the termination of lever 50 away from pivot 51.

The central arm of lever 50 has formed therein a circular aperture 60 through which passes a collar 61 having its front end and rear end on opposite sides of the lever. The collar 61 carries at its front end a stubby high carbon pencil 62 which is received within the bore of the collar, and which is locked in position in that bore by a set screw 63 in threaded engagement with a hole formed in the side of the collar to pass through to the bore. The pencil 62 may be adjusted in position within the bore by first turning the set screw to unlock the pencil and by then turning the set screw to relock the pencil.

The rear end of the bore of collar 61 is threaded to receive in threaded relation the forward part of a set screw 70. This last-named set screw passes through a hole formed in one end of a leaf spring 71 to clamp that end of the leaf spring between the rear end of the collar and the head of the set screw 70. The other end of the leaf spring 71 is secured in any suitable manner to the lever 50. Thus the leaf spring acts to yieldably support the collar 61 from the lever 50.

The described pencil mounting fixture permits cueing of the tape 11 by the following method during recording of a program on the tape from the signal transfer head 13. The tape is continuously moved past the head at a speed of, say, 7½ inches per second. When the program reaches a point at which a cue is desired, the key 56 of bell-crank lever 50 is manually depressed to bing the lever against forward stop 55 and, concurrently, to bring the stylus of high carbon pencil 62 into pressure contact with the magnetic coating surface 22 of tape 11 at the portion of the tape which is backed by the cylindrical surface of roll 42. By virtue of the employment of leaf spring 71 to support collar 61 from lever 50, the amount of contact pressure exerted by pencil 62 on the tape is determined by the resiliency of the leaf spring rather than by the amount of manual pressure exerted on key 56. The resiliency of leaf spring 71 is selected to be of a value which produces a very moderate contact pressure between the pencil and the tape. I have found that, by employing such moderate contact pressure and, also, by backing the tape at the point of contact by a rotatable member such as idler roll 42, the frictional drag of the longitudinally stationary pencil 62 on the moving tape 11 is a drag which can be rendered so low in value as to have a negligible effect upon the speed of movement of the tape through the machine. I have further found that, despite the moderate contact pressure employed, the movement of the tape under the stylus of the stationary pencil 62 will produce on the surface 22 of the tape an entirely satisfactory streak or cue mark of high carbon material. Therefore, the described procedure enables a cue mark to be placed on the tape while the recording of the program continues uninterruptedly. After a mark of desired length has been made on the tape, the key 56 is released, the spring 53 returns the lever 50 to rearward position against rear stop 52 and the marking of the tape is thus terminated.

The roll 42 and pencil 62 are located a predetermined distance along tape 11 from the signal transfer head 13. Therefore, the described method of marking a moving tape with a stationary pencil is a method which can be used for the same purposes as those hitherto described for the method which has been discussed in connection with FIGURE 2. If desired, the mark on the moving tape can be made by a pencil which is held and positioned by hand rather than by the described pencil mounting fixture of FIGURE 1. Further, the mark can be made as the result of combined movement of the tape and of movement of the pencil of the sort illustrated by FIGURE 2. The method described in connection with FIGURE 1 is applicable not only when a program is being recorded by the FIGURE 1 machine, but, also, when a hitherto uncued program is being reproduced by that machine.

Once cue marks have been produced on the tape by one of the methods previously described, such cue marks may be detected visually in the manner which has been discussed in connection with FIGURE 2. In many applications, however, it is desirable for the cue marks to be detected in a manner whereby an electrical signal is produced each time the moving tape carries a cue marks past a predetermined location in the guide path for the tape. Such electrical detection of the described cue marks is accomplished by disposing at such a location a pair of electrodes 80, 81 (FIGURES 1 and 3) which are longitudinally separated by a gap of, say, ⅜ inch, and which each contacts the magnetic coating surface 22 of the tape as the tape moves through the FIGURE 1 machine.

As shown by FIGURE 1, the electrodes 80, 81 may be in the form of short cylindrical metal rods which are mostly embedded within the insulating material of a post 83 upstanding from the plate 11, but which lie to one side of a chordal slot in that post in such manner that the electrodes 80, 81 project only silghtly into the slot 84. The portions of the electrodes 80, 81 which are exposed within slot 84 are portions of sufficient length to extend over the entire width of tape 11. The two electrodes 80, 81 are connected by, respectively, the leads 85, 86 to one of the cue detecting circuits to be later described. Further details are given in my mentioned U.S. Patent No. 2,908,771 of a suitable structure for the cue detecting fixture which is provided by the post 83 and its associated components.

The described fixture with its electrodes 80, 81 may be used for cue detection both when the cue marks are produced by the method discussed in connection with FIGURE 2, and when such cue marks are produced by the method described in connection with FIGURE 1. In the instance of the FIGURE 3 method, the electrode 80 (which is the nearer of electrodes 80, 81 to head 13) is located relative to pointer 26 such that, when the tape is threaded to pass over the electrodes, the electrode 80 is separated by the same distance along tape 11 from head 13 as the distance by which, when tape 11 is threaded to pass pointer 26, the pointer 26 is separated from head 13. This equal separation distance along the tape from head 13 of the pointer 26 and of the electrode 80 is represented in FIGURE 3 by the showing of electrode 80 as located directly below the pointer 26 shown in FIGURE 2.

In the instance of the practice of the method which has been described in connection with FIGURE 1, the electrode 80 is so located relative to backing roll 42 and the stylus of pencil 62 that, when the tape is threaded (as indicated in FIGURE 1 by dash line 87 to pass over the electrodes 80, 81, the electrode 80 is separated by the same distance along the tape from signal transfer head 13 as are roll 42 and the mentioned stylus when the tape is threaded (as shown in FIGURES 1) to pass between roll 42 and the stylus of pencil 62.

The detection of abrasively transferred streaks depends upon the sensing by the electrodes 80, 81, of a difference in the resistance bridging the electrode gap in the instances when such gap is bridged by, respectively, an unmarked portion of tape and a portion of tape which is marked by such a streak. I have found that, for a gap of ⅜ inch size, a width of tape of from about ¼ to ½ inch, and a dry tape, the resistance between electrodes is, for an unmarked portion of tape, of the order of from 5 to 10 megohms. On the other hand, when the tape surface is moist because of excessive humidity, the resistance between electrodes for an unmarked tape portion may drop to a value as low as 200,000 ohms.

In comparison to those resistance values which have been obtained for unmarked portions of tape, a tape portion which has been marked by an ordinary lead pencil is characterized by an inter-electrode resistance of about 200,000 ohms. This value is substantially less than the 5 to 10 megohm value for the inter-electrode resistance of unmarked tape which is dry, but it is of the same order of magnitude as the inter-electrode resistance characterizing unmarked tape which is moist. Thus, the use of an ordinary lead pencil to produce a cue mark is disadvantageous for the additional reasons that (1) a mark from such pencil cannot easily be distinguished electrically from an unmarked portion of tape when the tape is moist, and (2) in any event, the detection of the mark requires a detecting instrument of undesirably high sensitivity.

I have found, on the other hand, that when a cue mark is made by a high carbon pencil (particularly the Dixon No. 2225), and when this pencil leaves a streak of a width of about 1/32 of an inch, the inter-electrode resistance of a so marked portion of the tape has a value of about 30,000 ohms. This 30,000 ohm value can be easily differentiated by an electrical instrument from the 5 to 10 megohm value which characterizes the unmarked dry tape, or from the 200,000 value which characterizes the moist unmarked tape. Further, if desired, the inter-electrode resistance of a portion of tape marked by such high carbon streak can be brought to a value as low as 6,000 ohms by going over the streak several times with a high carbon pencil to thereby widen the streak.

In a life test which I have made of a high carbon cue mark, the cue mark was run over 11,000 times past a pair of sensing electrodes connected to an instrument which gave a signal whenever the electrodes were bridged by the cue mark. While, over the course of the tests, the interelectrode resistance of the cue mark increased slightly (from 30,000 ohms at the beginning to about 44,000 ohms at the end), at no time did the cue mark fail to produce a signal because of a crack developing in the cue mark or because of smudging or frictional wearing away of the cue mark as a result of repeated passage of the tape past the sensing electrodes.

FIGURE 3 shows a simple electrical circuit for producing a signal in response to bridging of the electrode 80, 81 by a cue mark of the sort described. In this circuit, the electrode 81 is connected through the lead 86 to the positive terminal 90 of a voltage source (represented by a battery) whose output is a voltage of a value of, say, about 100 volts. The electrode 80 is connected through lead 85 to one terminal of a signaling instrument 92, the other terminal of this instrument being connected by lead 93 to the negative terminal 94 of the voltage source 91. When the electrodes 80, 81 are bridged by an unmarked portion of tape 11, the current which flows around the described circuit is so minuscule as to have no effect upon the signaling instrument 92. When, however, the electrode 80, 81 is bridged by the cue mark 29, the low inter-electrode resistance provided by the cue mark produces a flow of current which actuates instrument 92 to produce a signal. The current which so actuates instrument 92 may have a value of as little as 10 to 15 microamperes.

While the instrument 92 is represented in FIGURE 3 as an ammeter, such instrument (together with means, when needed, for amplifying the actuating signal) may be another type of signaling instrument as, say, a buzzer, an indicator light, a relay for actuating a utilization device, or a relay connected to the FIGURE 1 machine to stop the movement of the tape through that machine.

From the foregoing, it will be appreciated that the described methods of producing and detecting cue marks are methods which are capable of being entirely practiced by hand. To wit, the cue marks can be produced by hand in any of the ways hitherto described. In connection with the detection of cut marks so produced, the tape 11 can be run by hand past the electrodes 80, 81 (FIGURE 3) to bring a cue mark into bridging relations with those electrodes. Further, the lead 86 can be connected by hand to positive terminal 90 of voltage source 91, and the FIGURE 3 circuit can then be completed by grasping the lead 85 in one hand and by touching with another part of the body the negative terminal 94 of the source 91. So long as the electrodes 80, 81 remain bridged by an unmarked portion of the tape 11 the practitioner of the method does not sense any electrical effect. As soon, however, as the electrodes become bridged by a cue mark 29, the practitioner experiences a tingling sensation, and this sensation is a signal electrically indicating the presence of the cue mark.

Needless to say, the above described way of practicing the described methods by hand is not ordinarily the preferred way of practicing those methods. Such way of practice by hand is, however, of application in instances when it is desired to test the suitability for cue mark purposes of pencil streaks left on a tape, and when there is not available any instrument for indicating the degree of current conductivity of those streaks.

FIGURE 4 discloses another form of cue mark detection circuit. In this FIGURE 4 circuit, alternating current is supplied from a plug 160 adapted to be plugged into a wall outlet. The alternating current passes from plug 160 through the ganged contacts 101, 102 of an on-off switch to a pair of junctions 103, 104. Current flows from junction 103 to junction 104 through a circuit as follows: rectifier 105, resistor 106, junction 107, filter condenser 108, junction 109, and junction 110 which is connected by lead 111 to junction 104. This circuit rectifies and filters the applied alternating current to provide a source of DC voltage at junction 107.

The junction 107 is connected through a current limiting resistor 115 and a lead 116 to a junction 117. The junction 117 is connected to the anode 118 of a gaseous discharge tube 119 which also has a grid 120 and a cathode 121. The cathode 121 is connected to a junction 122 which is in turn connected through a lead 123 to the fixed contact 124 of an external control switch 125 having a movable contact 126 and an additional fixed contact 127. In ordinary operation, movable contact 126 is closed with fixed contact 124 so that fixed contact 124 is connected through movable contact 126 and lead 128 to one terminal 129 of a relay winding 130 whose other terminal is the junction 109. Thus, in ordinary operation, there is connected across the D.C. voltge supply the series combination of the current limiting resistor 115 and the anode-cathode path of the gaseous discharge tube 119. This tube may be, for example, a cold cathode type, neon triggering glow tube such as the NE 77 tube which is manufactured by the General Electric Company.

The junction 117 acts as the starting point for a number of circuits which will now be described. A first of these circuits is a voltage divider circuit extending from junction 117 through a high valued resistor 135, a junction 136 and another high valued resistor 137 to the junction 122. The junction 136 of this circuit is connected to grid 120 of the tube 119 to statically bias such grid below the value of grid potential which is adapted to fire the tube.

A second circuit extends from junction 117 through lead 85, electrode 80, a cue mark 29 (when such cue mark is present) the electrode 81, lead 86, the parallel combination of a capacitor 140 of small capacitance and a bleeder resistance 141, a lead 142, the fixed contact 143 and movable contact 144 of a timer switch 145 having another fixed contact 146, and through lead 147 to the junction 136 connected to the grid 120 of tube 119. This second circuit is completed only when the electrodes 80, 81 are bridged by a cueing mark 29, and when, simultaneously, the movable contact 144 of timer switch 145 is closed with the fixed cointact 143 thereof.

A third circuit starting at junction 117 is the circuit extending from that junction through a lead 150, the tap 151 and winding 152 of a potentiometer 153, and through a resistor 154 to the previously mentioned fixed contact 146 of timer switch 145. This third circuit is completed only when the timer switch is thrown to close its movable contact 144 with the fixed contact 146.

A fourth circuit starting at junction 117 is the circuit extending from that junction through lead 160, a charge storing condenser 161, and then through a lead 162 to the junction 104 which can be considered as the point to which all voltages in the system are related. This fourth circuit connects the charge storing condenser 161 in parallel with the series combination of the anode-cathode path through tube 119 and the relay winding 130.

A fifth circuit starting at junction 117 is the circuit provided by the quenching condenser 170 which is connected between junction 117 and junction 122, i.e., in parallel with the annode-cathode path through tube 119.

The relay winding 130 surrounds an armature 180 which operates a pair of ganged movable relay contacts 181 and 182. Of these movable contacts, the contact 181 is connected to junction 110 (and thus to the voltage reference point 104), while the contact 182 is connected through a lead 183 with a pin socket 184 of a receptacle 185 adapted to receive a plug from a utilization device such as a film strip projector. Ordinarily, the movable contacts 181, 182 are in the shown upward position for which contact 181 closes with a blank fixed contact 185, and for which contact 102 closes with a fixed contact 186 connected through a lead 187 to the pin socket 188 of the receptacle 185. In this ordinary position for the movable contacts 181, 182, the closure of 181 with movable contact 185 is of no effect, whereas the closure of contact 182 with fixed contact 186 is effective to short together the pin sockets 184 and 188.

When relay winding 130 is energized by current, the movable contacts 181 and 182 close with, respectively, the fixed contacts 191 and 192. Of those fixed contacts, 191 is connected through lead 193 with a pin socket 194 of receptacle 185, whereas, contact 192 is connected through a lead 195 with a pin socket 196 of this receptacle. The remaining pin socket 197 of the receptacle is connected through a lead 198 with the junction 103 upon which appears the voltage of alternating value relative to the junction 104. The effect of the energization of the winding 130 and the consequent throwing of relay movable contacts 181, 182 is (1) to provide a return path through pin socket 194 of the alternating voltage applied to pin socket 197, and (2) to disconnect pin socket 184 from pin socket 188 and to connect such pin socket 184 to the pin socket 196. These are the actions required to actuate through the receptacle 185 the utilization device which, as stated, may be a film strip projector adapted when actuated to project a new picture onto a screen.

In ordinary operation, the FIGURE 4 circuit is adapted to synchronize actuation of the utilization device with the cue marks detected on tape 11 in a manner as follows:

In usual operation, the movable contact 144 of timer switch 145 is closed with fixed contact 143 thereof, and, also, the capacitor 140 is fully discharged. In the absence of the bridging of electrodes 80, 81 by a cue mark 29, the grid 120 of tube 119 is biased by the voltage divider unit 135, 136 so as to preclude the tube 119 from firing. When, however, the movement of tape 11 brings a cue mark 29 to a position where such cue mark bridges electrodes 80, 81, the positive voltage at junction 117 is coupled through electrode 80 cue mark 29 and electrode 81 to the capacitor 140. Inasmuch as the voltage across capacitor 140 cannot change instantaneously, a transient surge of positive voltage is at that time transmitted through capacitor 140 and the now closed contacts 143, 145 to the grid 120. This voltage surge raises the grid to a potential which fires tube 119. When the tube is so fired, current flows from junction 117 through the anode-cathode path of the tube and through the winding 130 to operate the relay contacts 181, 182 to thereby actuate the utilization device which is connected to receptacle 185.

While tube 119 is in the fired condition, some of the tube current is drawn from junction 107 through the resistor 115. This resistor has, however, the effect of limiting the current so drawn to a value which is less than that necessary to sustain the fired condition of the tube. The remainder of the current necessary to sustain such fired condition is provided by a discharge through the tube of the condensers 161 and 170. The former condenser 161 discharges rather slowly inasmuch as it is of large capacitance, and inasmuch as the relay winding 130 acts as an impedance in the discharge path for the condenser. In contrast, the condenser 170 discharges rapidly for the reason that it is connected directly across the anode-cathode path of the tube 119. Thus, it is the condenser 170 which primarily determines the time period during which the tube 119 is fired and during which, consequently, the relay winding 130 is energized. This period is ended by a dropping below discharge-sustaining value of the potential across tube 119, whereby the tube becomes quenched.

The potential at which tube 119 quenches is below the anode-cathode potential needed to fire the tube. Thus, the tube 119 is disabled from firing in response to a following bridging of electrodes 80, 81, by a cue mark until after condensers 161 and 170 have been recharged from junction 107 and through resistor 115 in an amount which restores the potential across the tube to a firing value. This disabling feature is advantageous inasmuch as it prevents a false firing of the tube in the event a given cue mark is cracked, whereby electrodes 80, 81 are bridged in quick succession by the two separate electroconductive sections into which the cue mark is divided by the crack. In this connection, I have found it desirable to make the cue marks substantially longer than the size of the gap between electrodes 80, 81 so that even though, through inadvertence, the cue mark is divided by discontinuities into two or more sections, at least one of those sections will probably be long enough to bridge the gap. The described disabling feature permits me to make the cue marks several times longer than the gap without such excess length of the cue marks resulting in mis-firing of the tube.

Another disabling effect is provided by capacitor 140. As stated, before a cue mark bridges the electrodes 80, 81, the capacitor 140 is completely discharged to thereby be in a condition to transmit a positive voltage pulse to the grid of tube 119. The transmission of this pulse is followed, however, by full charging of capacitor 140 at the beginning of the firing period of the tube and within a time interval which is much shorter than that of the firing period. When capacitor 140 is so fully charged, the capacitor is no longer effective to raise the voltage on grid 120, and, hence, the capacitor can be considered as being out of the circuit entirely. This, in effect, leaves the interelectrode resistance of bridging cue mark 29 and the resistance of bleeder resistor 140 as resistances in a series combination which is connected in parallel with the resistor 135 of the voltage divider unit 135, 136. The total resistance of the series combination is of a value so that the net resistance provided by the parallel connection of resistor 135 and of the mentioned series combination is a resistance which is not sufficiently low relative to that of resistor 137 to raise the voltage on grid 120 to the potential needed to fire tube 119.

Hence, the tube 119 is disabled from firing until after capacitor 140 has been discharged by its bleeder resistor 141. Evidently, such discharging of capacitor 140 cannot take place until the electrodes 80, 81 are no longer bridged by a cue mark.

The disabling of tube 119 by the described action of capacitor 140 is advantageous in that (1) it renders the operation of the FIGURE 4 circuit independent of the length on the tape 11 of the cue marks impressed thereon (so long as such marks are at least long enough to bridge the electrodes); (2) it prevents false firing of the tube in the instance when a cue mark is divided by one or more cracks into one or more separate electroconductive sections; and (3) it precludes false firing of tube 119 in the event the movement of tape 11 is stopped in a position where, inadvertently, the electrodes 80, 81 are bridged by a cue mark.

In the event that it is desired to actuate the utilization device from the FIG. 4 circuit in a manner not requiring the bridging of the electrodes 80, 81 by a cue mark, this can be done by throwing the movable contact 144 of timer switch 145 to break contact with fixed contact 143 and to make contact with fixed contact 146. Each time contact 144 is closed with contact 146, positive voltage is transmitted from junction 117 through elements 151, 152, 154, 146, 144 and 147 to grid 120 to produce firing of tube 119 and consequent energization of relay winding 130. If contact 144 is left closed with contacts 146, the tube 119 acts as a relaxation oscillator, whereby the tube repetitively fires at intervals of, say, two seconds.

Another way of energizing winding 130 independently of the cue marks is to throw the movable contact 126 of the external control switch 125 so as to transfer the movable contact 126 from closure with fixed contact 124 to closure with fixed contact 127. Such transfer of movable contact 126 connects relay winding 130 across the junctions 103, 104, whereby the winding is energized by alternating current to operate the relay contacts 181, 182 in the manner hitherto described. The relay contacts 181, 182 when so operated produce actuation through receptacle 185 of the utilization device. Such alternating current energization of winding 130 is employed in instances where it is desired to manually actuate the utilization device at a more rapid rate than would be permitted by energization of the winding through firings of the tube 119, such firings being necessarily spaced apart in time by the intervals required for the tube to recover its firing potential. The advantage in employing alternating current for manual energization of the winding 130 and direct current for cue mark energization of the winding 130 in that such arrangement permits a much smaller D.C. power supply to be used for tube 119 than the power supply which would be necessary if such tube were required to supply the current for the winding in the instance of manually controlled energization as well as in the instance of cue mark controlled energization.

The above described embodiments being exemplary only, it will be understood that the invention comprehends embodiments differing in form and/or detail from those specifically set forth above. For example, the stylus which is used to mark the tape need not be the stylus of a pencil, but may be an unsheathed stylus of marking material. The marking material employed need not be high carbon material but may be other materials having suitable marking or suitable marking and electroconductive properties as, say, marking materials formed of a powder of an electroconductive metal and of a suitable binder for the metal powder. Evidently, the cue marks need not extend lengthwise of the tape, but, instead, may extend transversely of the tape, in which case the electrodes 80, 81 are spaced apart in the transverse direction of the tape. The invention is of application in the instance where the program to be cued is any kind of program as, say, a program of telemetering or computer controlling signals instead of a sound program.

The method hitherto described in connection with FIG. 2 can also be practiced in conjunction with the FIG. 1 apparatus as an alternative to the methods hitherto described in connection with FIG. 1. To wit, a tape having a prerecorded program thereon may be threaded past rolls 42–44 and the tape-handling machine then operated to draw the tape past head 13 and to thereby reproduce the program on a speaker or the like. When the reproduced program reaches a point for which a cue mark is desired, the tape is stopped and the cue mark is made by using center roll 42 as the backing for the tape and by drawing the described stylus over the magnetic coating surface opposite roll 42 to leave on that surface a cue mark of the sort described. When the program is again reproduced, the cued point of the program is indicated by the visually detected registration of the cue mark so made with the portion of the tape path which lies between rolls 43 and 44.

Accordingly, the invention is not to be considered as limited save as is consonant with the scope of the following claims.

I claim:

Apparatus for producing a cue mark on a magnetic tape threaded in a guide path which leads past a signal transfer head, said apparatus comprising, a member disposed to one side of said path to provide a backing for said tape, a stylus holder disposed on the other side of said path opposite said member and adapted to carry a friable stylus, a stylus-holder mounting disposed on the other side of said path and having a portion displaced towards said path from a portion of said holder, said mounting being movable towards and away from said path and member, a stop cooperative with said mounting to arrest at a terminal position the movement of said mounting towards said path, and a tension spring having opposite ends respectively connected to said portion of said holder and said portion of said mounting so as to couple the former to the latter, said spring being adapted during movement of said mounting towards said path to transmit said mounting movement to said holder until said stylus contacts said tape and to thereafter resiliently stretch until said mounting reaches said terminal position, said spring then pressing said stylus against said tape with a force which increases with the amount of stretch then characterizing said spring, and said spring being further adapted during movement of said mounting away from said path to transmit said last-named mounting movement to said holder to retract said stylus from said tape.

References Cited

UNITED STATES PATENTS

| | | | |
|---|---|---|---|
| 1,950,518 | 3/1934 | Read | 179—100.2 |
| 1,955,497 | 4/1934 | Harvey | 179—100.2 |
| 2,385,861 | 10/1945 | Jones | 179—100.3 |
| 2,561,602 | 7/1951 | Valentino | 179—100.2 |
| 2,659,533 | 11/1953 | Quinby et al. | 317—149 |
| 2,734,948 | 2/1956 | Mueller | 179—100.2 |
| 2,819,940 | 1/1958 | Sorrells | 179—100.2 |
| 2,925,312 | 2/1960 | Hollmann | 346—74 |

OTHER REFERENCES

Theory and Applications of Election Tubes, Reich, 2nd ed., 1944; McGraw Hill, N.Y.; pp. 477 and 522.

BERNARD KONICK, *Primary Examiner.*

ROBERT H. ROSE, IRVING L. SRAGOW, W. J. BETHURUM, D. G. REDINBAUGH, F. C. WEISS, S. M. URYNOWICZ, *Assistant Examiners.*